C. E. ACKER.
PROCESS OF OBTAINING NITROGEN.
APPLICATION FILED SEPT. 2, 1910.
999,003.
Patented July 25, 1911.
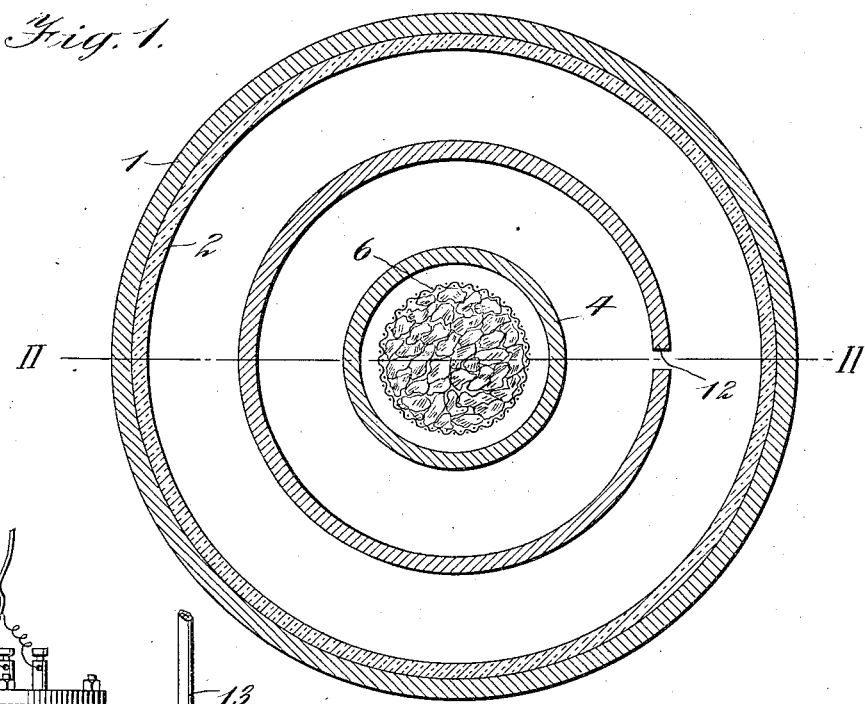
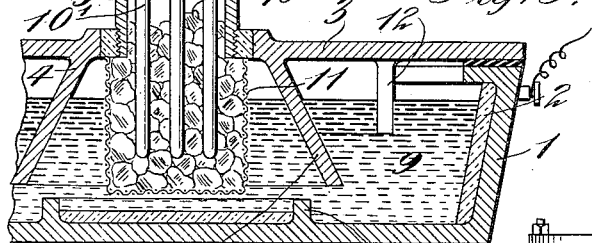
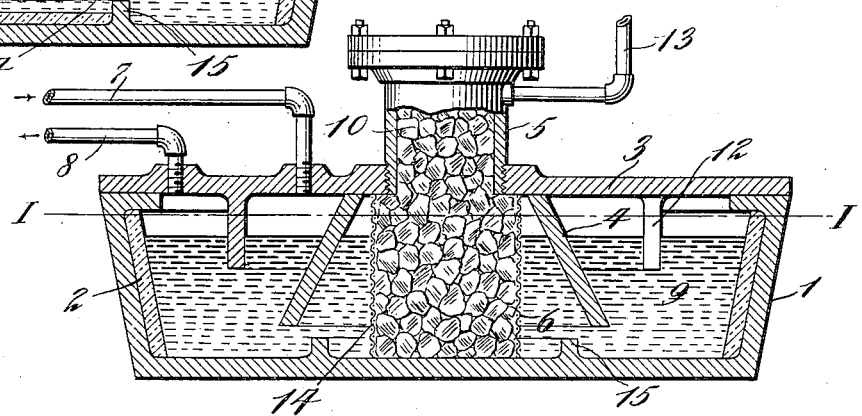

UNITED STATES PATENT OFFICE.

CHARLES E. ACKER, OF OSSINING, NEW YORK, ASSIGNOR TO THE NITROGEN COMPANY, A CORPORATION OF NEW YORK.

PROCESS OF OBTAINING NITROGEN.

999,003.  Specification of Letters Patent.  Patented July 25, 1911.

Application filed September 2, 1910. Serial No. 580,191.

*To all whom it may concern:*

Be it known that I, CHARLES E. ACKER, a citizen of the United States, residing at Ossining, in the county of Westchester and State of New York, have invented certain new and useful Improvements in Processes of Obtaining Nitrogen, of which the following is a full, clear, and exact description.

My invention relates to the production of nitrogen from atmospheric air and specifically to processes for removing oxygen from air in such manner as to leave the residual nitrogen in condition for use in the manufacture of nitrogen compounds,—particularly cyanids, which require nitrogen.

A commonly described method of removing oxygen from air consists in passing the air through a body of red hot or incandescent coal, whereby the oxygen combines with some of the coal to form carbon monoxid and carbon dioxid gases, which are then removed from the residual nitrogen by absorption in various ways. It is easy to absorb the latter gas, but the absorption of carbon monoxid is more difficult and expensive.

Other methods comprise the removal of oxygen from air by passing the air over red hot copper, whereupon the oxygen combines with copper to form copper oxid. This method works satisfactorily on a very small scale when the copper is freshly prepared, but the efficiency of the large copper surface required to remove the oxygen, soon diminishes very markedly, and the process of restoring it to its original condition is expensive.

The present method consists in bringing air—previously deprived of all moisture and carbon dioxid—into contact with molten sodium or potassium cyanid, or a mixture thereof, at a temperature of 500° C. or over whereupon the oxygen of the air will react with a portion of the cyanid, *e. g.*, sodium cyanid (NaCN) to form sodium cyanate (NaCNO) which, being perfectly miscible with the cyanid, will diffuse throughout the molten mass, while the nitrogen content of the air will remain unaffected and may be collected in the pure state. The cyanate is also of substantially the same density as the cyanid.

The sodium cyanate contained in the molten cyanid may be continuously or intermittently reduced to sodium cyanid as it accumulates above a certain percentage in the mass, by means of certain metals, and also by carbon. The metal, *e. g.*, iron, combines with the oxygen of the cyanate to form iron oxid which contaminates the cyanid; but will settle to the bottom of the molten mass if undisturbed. The iron does not begin to reduce the cyanate until the latter constitutes about 10% or more of the molten mixture, but it will continuously reduce any cyanate which may be formed in the mixture in excess of this approximate percentage. Zinc will also continuously reduce the cyanate which may tend to accumulate above a certain percentage (not determined) in the molten cyanid. The zinc oxid may be separated by settling and collected for use as such.

Carbon easily reduces the cyanate and forms a gaseous oxid (CO), which removes itself entirely and continuously from the molten cyanid and does not contaminate it.

Coal may be used as the source of carbon, the impurities so introduced, to wit, the ash in the coal, not being particularly objectionable. If therefore, air be injected into or passed over the surface of a body of molten sodium cyanid contained in a suitable metal retort, which also contains lumps of anthracite coal submerged in the cyanid, the oxygen of such air will combine with some of the molten cyanid to form sodium cyanate, which will diffuse in the cyanid, and come into contact with the coal, which will promptly reconvert it into sodium cyanid with evolution of carbon monoxid gas.

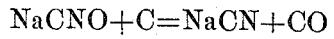

$$NaCNO + C = NaCN + CO$$

If the reduction be effected in an ordinary pot or retort the carbon monoxid will rise through the melt and mix with the residual nitrogen of the air so that the product will be worthless.

One of the objects of the present process is to continuously (or intermittently) remove the oxygen from air by means of molten cyanid and to continuously (or intermittently) reduce the resultant cyanate by means of coal in such manner that the carbon monoxid does not come into contact, nor mix with the nitrogen, which may therefore be obtained pure.

Forms of apparatus which may be used for this purpose are shown in the accompanying drawings which form a part hereof.

In said drawings: Figure 1 is a transverse horizontal section of one form of apparatus taken on line I—I of Fig. 2. Fig. 2 is a vertical section taken on line II—II of Fig. 1. Fig. 3 is a similar section of a modified form of apparatus.

Referring to the drawings, a suitable metal pot 1, is provided, which may be fitted with a refractory lining unaffected by molten cyanid or cyanate, such as magnesia or alumina brick 2. Instead of lining the pot with brick or any vitreous substance I may employ copper, or any metal which is incapable of continuously reducing sodium cyanate, under the conditions of the process. No lining of any kind is absolutely required, however, if the pot be made of copper, as the cyanate content in the melt may be maintained so low that the copper will barely reduce it. The pot is fitted with a gas tight cover 3, to which is attached a bell 4, a hopper 5, and a heavy wire cloth basket 6. The cover also carries the air inlet pipe 7 and the nitrogen exit pipe 8.

The pot is filled with molten sodium cyanid 9, to within a short distance of the cover, say 1 or 2 inches. The wire basket 6 is filled with anthracite coal or other form of carbon 10, which should be as pure as possible. The apparatus thus charged is heated to a low red heat in any appropriate coal or gas-fired furnace; or it may be heated internally as shown in Fig. 3, by passing an alternating current of electricity, of suitable voltage and current density through the cyanid, constituting a resistance medium; the electrodes consisting, on the one hand, of one or more carbon rods 10', projecting into the basket 11, from above, and the pot itself, on the other. The carbon electrodes may be used as a source of carbon in the process instead of anthracite coal, or may be used jointly therewith. The air is introduced in a slow stream through the pipe 7, and thus comes into contact with a large surface of molten cyanid, which combines with and eliminates all of the oxygen as the gas slowly passes over its surface toward the exit pipe 8. The gas on entering the pot is forced to pass through the shallow space or passes between the surface of the cyanid and the cover of the pot to the exit pipe, and by providing suitable partitions or baffles, may be guided along a more or less circuitous or tortuous path. Annular passages may be provided by dividing the single wide passage or channel into two or three narrower channels by means of partitions 12, extending from the cover down a short distance into the cyanid, in such way that the gas will be forced to follow along the partitions and thus travel two or three times around the pot in contact with the surface of the molten cyanid. Such an arrangement increases the capacity of a given sized pot for the rapid extraction of oxygen from the air. The sodium cyanate produced at the surface of the molten cyanid gradually diffuses throughout the entire mass, and thus comes into contact with the anthracite coal contained in the basket 6 (or 11), which reduces the cyanate and evolves carbon monoxid gas. The latter passes up through the coal and the molten mass into the hopper and thence escapes through the exit pipe, 13. Some of the carbon monoxid may be liberated at the surface of the coal in immediate contact with the basket, say at the point 14, and may then rise through the cyanid outside of the basket; but it is prevented by the deflector or bell 4, from passing outside thereof and thus rising into the nitrogen channels and contaminating the nitrogen. Any fine particles of anthracite which may pass through the screen and fall to the bottom of the pot must be prevented from falling outside of the area covered by the bell, otherwise such particles of coal would liberate gaseous carbon monoxid which would then rise through the melt outside of the bell. The annular rib 15, which may form a part of the bottom of the pot, provides against this contingency.

The apparatus as described is adapted to work continuously. The air may be drawn through the apparatus by a slight suction; or it may be introduced under a slight pressure. Carbon monoxid may be withdrawn under a slight suction through pipe 13, and it may be utilized as desired.

In general, any form of apparatus which will permit the physical separation of nitrogen and carbon monoxid will answer my purpose.

The cyanid may be circulated or agitated to more rapidly change the absorbing surface; to promote the diffusion of the cyanate, etc.; but this is not absolutely essential.

What I claim, is:

1. The method of obtaining nitrogen from the air which comprises bringing a quantity of air into intimate contact with an anhydrous non-metallic fluid capable of taking up oxygen and which may thereafter be deprived of the oxygen taken up, rapidly and efficiently, combining the entire oxygen content of such air with a constituent of said fluid to form a substance the density of which is at least substantially that of the fluid, and separating the nitrogenous residue from said fluid.

2. The method of obtaining nitrogen from the air which comprises bringing a quantity of air into intimate contact with a non-metallic fluid having a strong affinity for oxygen and which may, after combining with oxygen, be reduced, said fluid containing carbon and nitrogen, rapidly and efficiently combining the entire oxygen content of such air with a constituent of the fluid to form a substance of substantially the same density as said fluid, and separating the nitrogenous residue from said fluid.

3. The method of obtaining nitrogen from the air which comprises bringing a quantity of air into intimate contact with a fused anhydrous salt which has a strong affinity for oxygen, combining the entire oxygen content of such air with constituents of said salt, and separating the nitrogenous residue therefrom.

4. The cyclic process of obtaining nitrogen from the air which comprises reacting on the oxygen content of a quantity of air with a fused anhydrous reagent capable of combining with the oxygen of said air, separating the gaseous nitrogenous residue from the compound so formed and reacting on said compound with a substance capable of combining with oxygen, to reform the anhydrous reagent.

5. The cyclic process of obtaining nitrogen which comprises treating a substance which contains nitrogen and oxygen with a fused anhydrous reagent having a strong affinity for oxygen, separating the gaseous nitrogenous residue from the compound so formed and reacting on said compound with a carbonaceous reagent to re-form the anhydrous reagent.

6. The cyclic process of obtaining nitrogen which comprises treating a substance which contains nitrogen and oxygen with a carbonaceous salt capable of vigorously reacting with oxygen, separating the gaseous nitrogenous residue from the compound so formed and reacting on said compound with a carbonaceous reagent to re-form the carbonaceous salt.

7. The cyclic process of obtaining nitrogen which comprises treating a substance which contains nitrogen and oxygen with a nitrogen-carbon compound capable of vigorously reacting with oxygen, separating the gaseous nitrogenous residue from the resultant compound, and reacting on such resultant compound with a reagent capable of combining with oxygen to re-form the nitrogen-carbon compound.

8. The process of obtaining nitrogen which comprises treating a substance which contains nitrogen and oxygen with a cyanogen compound to form a cyanate, separating the nitrogenous residue from the cyanate and reacting on the latter substance with a carbonaceous reagent to re-form the cyanogen compound.

9. The process of obtaining nitrogen which comprises directing a current of air into contact with a bath of fused salt having a strong affinity for oxygen, combining the oxygen content of the air with constituents of said salt to form a substance which is diffusible through the body thereof, the residual atmospheric nitrogen being unacted upon, and reacting on the said substance with a reagent capable of readily reacting therewith to form a gaseous compound and to re-form the original salt, the residual nitrogen aforesaid being maintained separate from said gaseous compound.

10. The process of obtaining nitrogen which comprises subjecting a substance which contains nitrogen and oxygen to contact with a fused anhydrous fluid having a strong affinity for oxygen, separating the nitrogenous residue from the compound so formed and successively treating portions of said fluid with a reagent to eliminate the so combined oxygen therefrom, restoring it to its original condition.

11. The process of obtaining nitrogen which comprises subjecting a substance which contains nitrogen and oxygen to contact with a fused anhydrous fluid, having a strong affinity for oxygen, at one portion of said fluid, separating the anhydrous residue from the compound so formed and treating said fluid at another portion thereof, with a reagent to eliminate the so combined oxygen therefrom, restoring it to its original condition.

12. The process of obtaining nitrogen which comprises treating a substance which contains nitrogen and oxygen with a cyanogen compound to form a cyanate, separating the nitrogenous residue from the cyanate and reacting on the latter substance with a reagent to reform the cyanogen compound.

In witness whereof, I subscribe my signature, in the presence of two witnesses.

CHARLES E. ACKER.

Witnesses:
WALDO M. CHAPIN,
WILLIAM C. LARY.